Dec. 2, 1930.  V. G. APPLE  1,783,269
DIRECT DRIVE ELECTRIC RAILWAY TRUCK
Filed June 14, 1928   2 Sheets-Sheet 1
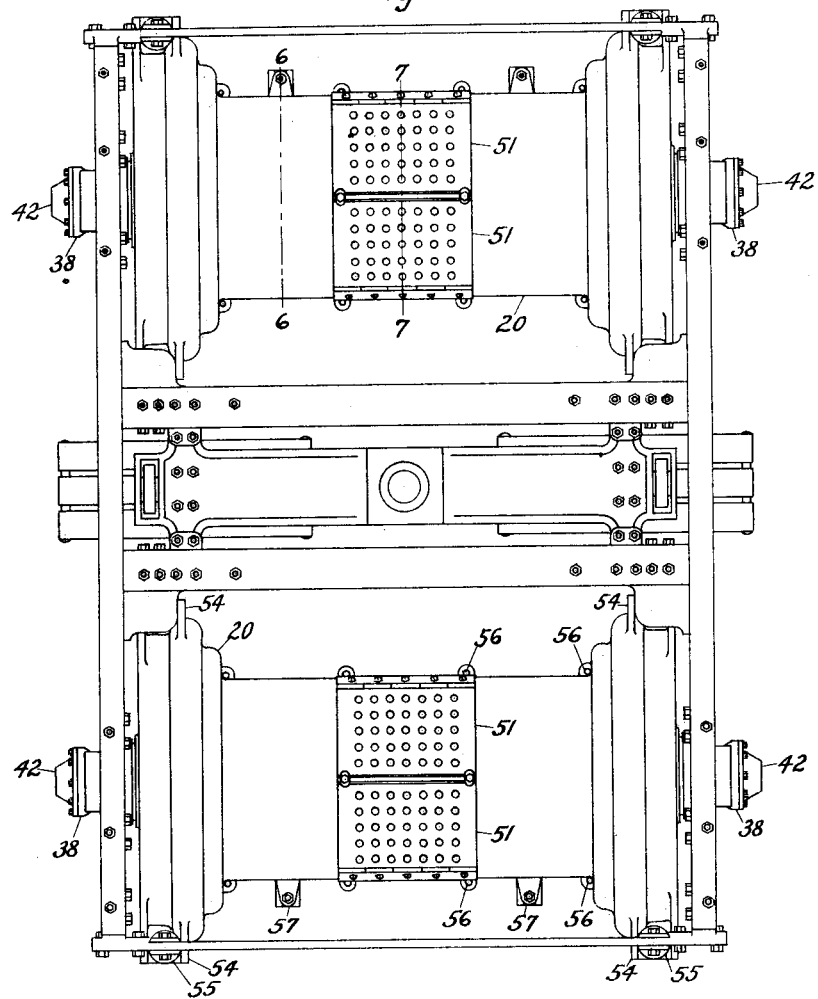
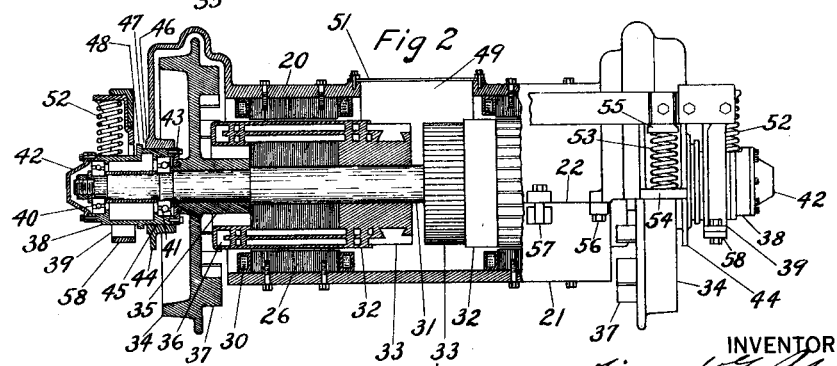
INVENTOR Dec. 2, 1930. V. G. APPLE 1,783,269
DIRECT DRIVE ELECTRIC RAILWAY TRUCK
Filed June 14, 1928 2 Sheets-Sheet 2
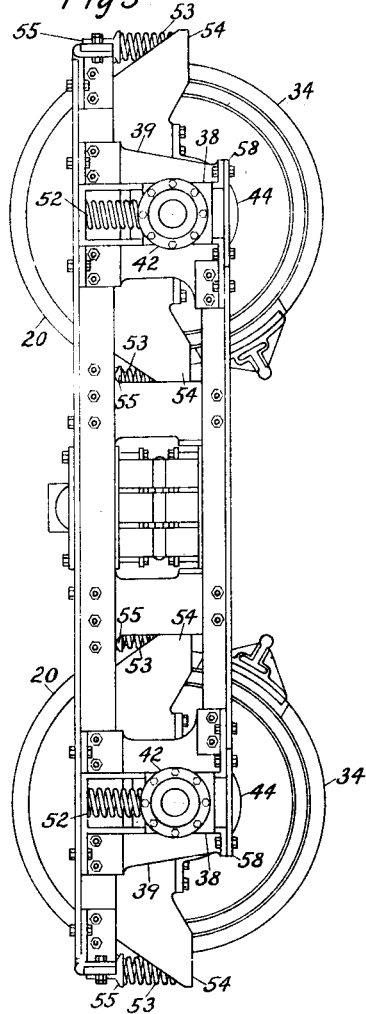
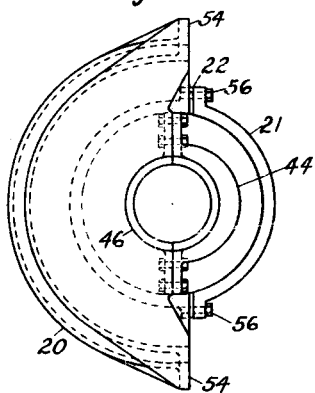
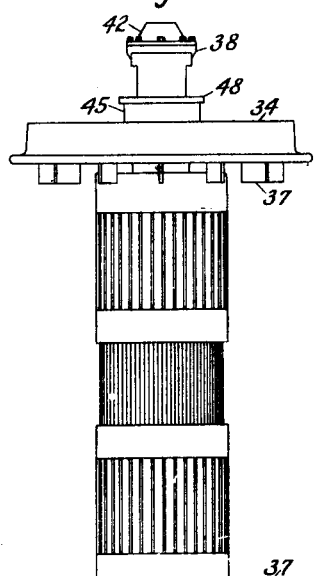
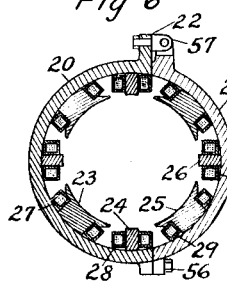
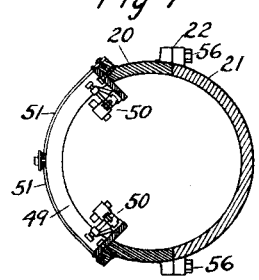
INVENTOR
Vincent G. Apple
BY
ATTORNEY Patented Dec. 2, 1930

1,783,269

UNITED STATES PATENT OFFICE

VINCENT G. APPLE, OF DAYTON, OHIO

DIRECT-DRIVE ELECTRIC RAILWAY TRUCK

Application filed June 14, 1928.  Serial No. 285,353.

The invention relates chiefly to improvements in that type of electric railway truck which has the motor armature and flanged car wheels mounted on the same axle and one of the objects of the invention is to provide a simple and practical construction which will be more durable and in which the parts requiring attention will be more accessible, to the end that many of the objectional features embodied in previous models of this type of truck will be eliminated.

Other objects of the invention will become apparent to those skilled in the art from a consideration of the description when taken in conjunction with the drawings wherein:

Fig. 1 is a plan view of my improved truck.

Fig. 2 is a rear view of the truck with part broken away to show a longitudinal vertical cross-section through part of one axle.

Fig. 3 is a side view of the truck.

Fig. 4 is an end view of a motor housing assembly.

Fig. 5 is a double armature having a common commutator at its middle portion.

Fig. 6 is a section taken on line 6—6 of Fig. 1.

Fig. 7 is a section taken on line 7—7 of Fig. 1.

By reference to the drawings it will be seen that without having deviated to any great extent from standard practice in the design of most of the parts, such as the bolster, springs, brakes, frame and journal box guides, I have omitted the two ordinary axle assemblies, each of which consists of a shaft having a flanged wheel and a journal and journal box at each of its ends, and substituted in their places two self-contained motor-axle units constructed as hereinafter described.

The motor housing consists of a main casting 20 and another casting 21 joined at 22, see Fig. 6, and bored at the inner diameter to form a seat for holding the pole pieces 23, 24, 25, 26, &c. These parts together with the field coils 27, 28, 29, 30, &c., comprise the motor field.

The axle 31 has mounted thereon two armatures 32, with their commutators 33 facing each other near the middle portion.

Wheels 34 are mounted on the axle 31 just outside of the armatures 32 with the wheel hubs 35 extending under the armature windings 36. The wheels 34 are similar to the standard car wheels except that they have a plurality of extending blades 37 which serve as a fan for cooling the motor windings.

Immediately outside of the wheels are mounted ball-bearing journal boxes 38 which are machined near their middle portion for vertical motion in the journal box guide casting 39, which is part of the truck frame assembly. The journal boxes 38 contain ball bearings 40 and 41 and have covers 42 and 43 to retain the oil. The whole journal box here used is substantially as now furnished by some manufacturers as standard equipment.

The main casting 20 is carried over the wheels 34. Attached to a machined surface at each end of casting 20 are caps 44. The inner diameter of the opening formed by cap 44 on casing 20 is bored concentric with the motor poles and this bored opening surrounds a turned portion 45 of the journal box 38 to maintain the concentric relation of the armature and field bore.

Hubs 46 on the motor housing are faced so as to leave a slight clearance, as at 47, between the hubs and the flanges 48 on the journal boxes. The clearances 47 admit of a slight axial movement of the motor housing relative to the shaft to compenate for unequal expansion from heating and to cause a more even wear from the brushes on the commutator. A large opening 49 in the upper side of main casting 20 provides a place to mount the brush gear 50, Fig. 7. Hinged lids 51 cover opening 49 to protect the brush gear against damage. Perforations in hinged lids 51 admit air which is drawn through the motors and expelled at the outer ends by fan blades 37. The commutators and brush gear centrally located as described make them readily accessible from the floor board of the car so that the brushes may be adjusted or renewed and the commutators cleaned.

The cushioning effect required between each motor-axle unit and the framework of the truck is supplied by six coil springs, one at each end of an axle, as at 52, resting directly on journal boxes 38 and extending upward to support the truck frame and two more at each end of each motor axle unit, as at 53, resting on projections 54 of main casting 20 and extending upward under brackets 55 which form part of the truck framework.

In any motor mounting there is required a means, preferably of a resilient nature, to take the field reaction in order to restrain the field from turning about its axis opposite to the direction of armature rotation, and it will be readily seen that while the coil spring arrangement described furnishes the required cushioning effect between the motor-axle unit and the truck frame, it supplies at the same time a resilient field reaction means which will operate equally well for either direction of armature rotation.

In considering the mechanical features of the structure it is evident that considerable space has been gained by utilizing the bearings which support the car as motor bearings as they are outside of the wheels, so that motors of greater length may be employed than would be possible in any design where the length taken by the motor bearings must be deducted from the space between the wheels; and while in the drawings I have shown two separate armatures to each axle, it may be sometimes desirable to join these two armatures into one having a commutator at its middle portion, as shown in Fig. 5.

In considering the electrical features of the structure it will be noticed that there are two motors to an axle, so that a car using four wheeled trucks, as shown, would have 8 motors and where trucks having more than 4 wheels are used the number of motors per car would be further increased. It is evident that with the increased number of motors the series parallel control commonly used becomes more flexible, and even when one long armature, with the commutator in the middle as previously described, is being used, there are still two separate field units to each axle which may be placed in series or parallel to insure a higher degree of flexibility than may be had in equipment as commonly constructed.

The parts of a traction motor requiring most frequent attention and adjustment are the commutator and brushes and these centrally located as described are readily accessible from the floor board of the car so that the brushes may be adjusted and the commutator cleaned while the car is in operation if desired. A further inspection of the motors may be made from under the car by dropping the lower part 21 of the housing which is bolted to the upper part 20 by bolts 56 and when the bolts are removed the lower part swings on hinges 57.

Should extensive repairs be found necessary the whole motor-axle unit may be taken from the truck frame by simply removing the bearing-guide plates 58, or if the repairs required are to the rotating element only the caps 44 may be removed and the lower housing 21 dropped on its hinges when the whole rotating element comprising the axle, armatures, wheels and journal boxes may be removed at once thus allowing truing of the commutators without removing any of the parts which are assembled on the axle.

While some difficulty has been experienced with direct drive trucks of prior design because the windings were not sufficiently rigid to withstand the jars and vibrations incident to inequalities in a rail track, I have provided against this difficulty by employing windings of my rigid type where both armature and field windings are solidly incased in moulded insulation material which insures them against the effects of vibration and moisture. These windings are fully described in other Letters Patent already granted me.

While in the drawings and description here given I have shown and described a motor unit having field elements mounted in the housing and armature elements mounted to rotate with the axle, it is understood that this arrangement may be reversed so that the housings will carry the armature elements and the axle the rotating fields when other conditions make such an arrangement desirable, and for convenience of description I will hereinafter refer to the rotating elements as rotors and the stationary elements as stators.

It is apparent that various other changes in the details of the structure may be made without departing from or exceeding the scope of the following, wherein I claim—

1. An electric motor-axle unit comprising an axle having journals at its outer ends, two wheels having ventilating fan blades extending therefrom mounted on the axle next to the journals, one or more rotors mounted on the axle between the wheels, and a housing carrying the stators extending over and beyond the wheels for support on the journals, said journals to serve as motor bearings and to carry their proportion of the weight of the car.

2. An electric motor axle unit comprising an axle having journals at its outer ends, two wheels mounted on the axle next to the journals, one or more rotors mounted on the axle between the wheels, a housing carrying the stators extending over and beyond the wheels for support on the journals, and a means to resiliently restrain the housing against motor reaction, the journals to serve as motor bearings and to carry their proportion of the weight of the car.

3. An electric motor-axle unit comprising an axle having journals at its outer ends, two wheels having ventilating fan blades extending therefrom mounted on the axle next to the journals, one or more rotors mounted on the axle between the wheels, a housing carrying the stators extending over and beyond the wheels for support on the journals and a means to resiliently restrain the housing against motor reaction, the journals to serve as motor bearings and to carry their proportion of the weight of the car.

4. An electric motor-axle unit comprising an axle having journals at its outer ends, two wheels mounted on the axle next to the journals, two rotors mounted on the axle between the wheels with the commutators adjacent at the middle of the axle and a housing carrying the stator and brush gear extending over and beyond the wheels for support on the journals, the housing having a brush gear access door at the top and midway of the wheels, the journals to serve as motor bearings and to carry their proportion of the weight of the car.

5. An electric motor-axle unit comprising an axle having journals at its outer ends, two wheels having ventilating fan blades extending therefrom mounted on the axle next to the journals, one or more rotors mounted on the axle between the wheels with the commutator or commutators near the middle of the axle, and a housing carrying the stators and brush gear extending over and beyond the wheels for support on the journals, the housing having a brush gear access door near its middle portion, and the journals to serve as motor bearings and to carry their proportion of the weight of the car.

6. An electric motor-axle unit comprising an axle having journals at its outer ends, two wheels mounted on the axle next to the journals, one or more rotors mounted on the axle between the wheels with the commutator or commutators near the middle of the axle, a housing carrying the stators and brush gear extending over and beyond the wheels for support on the journals, and a means to resiliently restrain the housing against motor reaction, the housing having a brush gear access door near its middle portion, the journals to serve as motor bearings and to carry their proportion of the weight of the car.

7. An electric motor-axle unit comprising an axle having journals at its outer ends, two wheels having ventilating fan blades extending therefrom mounted on the axle next to the journals, one or more rotors mounted on the axle between the wheels with the commutator or commutators near the middle of the axle, a housing carrying the stators and brush gear extending over and beyond the wheels for support on the journals and a means to resiliently restrain the housing against motor reaction, the housing having a brush gear access door near its middle portion, and the journals to serve as motor bearings and to carry their proportion of the weight of the car.

8. An electric motor-axle unit comprising an axle having substantially standard journals and journal boxes at its outer ends spaced apart to suit a standard truck frame, two flanged car wheels mounted on the axle next to the journals and spaced apart to suit a standard track, two rotors mounted on the axle between the wheels with the commutators adjacent at the middle of the axle, and a housing carrying the stators and brush gear extending over and beyond the wheels for support on the journals, the housing having a brush gear access door at the top and midway of the wheels the journals to serve as motor bearings and to carry their proportion of the weight of the car.

9. An electric motor-axle unit comprising an axle having substantially standard journals and journal boxes at its outer ends spaced apart to suit a standard truck frame, two flanged car wheels having ventilating blades extending therefrom mounted on the axle next to the journals and spaced apart to suit a standard track, one or more rotors mounted on the axle between the wheels with the commutator or commutators near the middle of the axle, and a housing carrying the stators and brush gear extending over and beyond the wheels for support on the journals, the housing having a brush gear access door near its middle portion and the journals to serve as motor bearings and to carry their proportion of the weight of the car.

10. An electric motor-axle unit comprising an axle having substantially standard journals and journal boxes at its outer ends spaced apart to suit a standard truck frame, two flanged car wheels mounted on the axle next to the journals and spaced apart to suit a standard track, one or more rotors mounted on the axle between the wheels with the commutator or commutators near the middle of the axle, a housing carrying the stators and brush gear extending over and beyond the wheels for support on the journals, and a means to resiliently restrain the housing against motor reaction, the housing having a brush gear access door near its middle portion and the journals to serve as motor bearings and to carry their proportion of the weight of the car.

11. An electric motor-axle unit comprising an axle having substantially standard journals and journal boxes at its outer ends spaced apart to suit a standard truck frame, two flanged car wheels having ventilating blades extending therefrom mounted on the axle next to the journals and spaced apart to suit a standard track, one or more rotors mounted on the axle between the wheels with the commutator or commutators near the middle of the axle, a housing carrying the stators and brush gear extending over and beyond the wheels for support on the journals, and a means to resiliently restrain the housing against motor reaction, the housing having a brush gear access door near its middle portion and the journals to serve as motor bearings and to carry their proportion of the weight of the car.

12. An electric motor-axle unit comprising an axle having substantially standard journals and journal boxes at its outer ends spaced apart to suit a standard truck frame, two flanged car wheels having ventilating blades extending therefrom mounted on the axle next to the journals and spaced apart to suit a standard track, one or more rotors mounted on the axle between the wheels with the commutator or commutators near the middle of the axle, a split housing carrying stator windings and brush gear, extending over and beyond the wheels for support on the journals, said housing having projections upon which part of the springs which support the car rest, said springs to serve to take the motor reaction and to help carry the car weight, the housing having a brush gear access door near its middle portion and the journals to serve as motor bearings and to carry their proportion of the weight of the car.

13. A part of an electric railway truck comprising a stator unit having means to resiliently resist motor reaction, the housing of the stator unit extending over and beyond the car wheels thus to use the car journals as motor bearings.

14. A part of an electric railway truck comprising a stator unit having projections on the housing thereof upon which a part of the car weight bearing springs rest, said springs to resiliently resist the motor reaction, said housing extending over and beyond the car wheels thus to use the car journals as motor bearings.

15. A part of an electric railway truck comprising a stator unit having projections on the housing thereof upon which a part of the car weight bearing springs rest, said springs to resiliently resist the motor reaction, and a brush access door centrally located in the housing, said housing extending over and beyond the car wheels thus to use the car journals as motor bearings.

16. An electric railway truck having axles with journals at the outer ends, wheels secured to said axles next to said journals, rotor elements secured to said axles between said wheels, commutating means secured to the axles midway of said wheels, housings carrying stator elements surrounding said rotor elements and extending over and beyond the wheels to the journals for support thereon, brush gear carried by said housings midway of said wheels, and brush gear access doors located in the top of the housings midway of the wheels, as and for the purpose set forth.

17. An electric railway truck having axles with journals at the outer ends, wheels secured to said axles next to said journals, fan blades carried by said wheels, rotor elements secured to said axles between said wheels, commutating means secured to said axles midway of said wheels, housings carrying stator elements surrounding said rotor elements and extending over and beyond the wheels to the journals for support thereon, brush gear carried by said housings midway of said wheels and perforated brush gear access doors located in the top of the housings midway of the wheels, as and for the purpose disclosed.

In testimony whereof I have hereunto set my hand.

VINCENT G. APPLE.